United States Patent
Baumgärtl et al.

(10) Patent No.: US 6,233,129 B1
(45) Date of Patent: May 15, 2001

(54) UNDERVOLTAGE CIRCUIT BREAKER WITH AN ELECTROMAGNET

(75) Inventors: Ulrich Baumgärtl; Wolfgang Röhl, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/894,581

(22) PCT Filed: Feb. 16, 1996

(86) PCT No.: PCT/DE96/00290

§ 371 Date: Feb. 12, 1998

§ 102(e) Date: Feb. 12, 1998

(87) PCT Pub. No.: WO96/26569

PCT Pub. Date: Aug. 29, 1996

(30) Foreign Application Priority Data

Feb. 24, 1995 (DE) .............................. 195 07 936

(51) Int. Cl.[7] ...................................... H02H 3/24
(52) U.S. Cl. ................................................ 361/92
(58) Field of Search .................. 361/78, 86, 88, 361/89, 92, 90

(56) References Cited

U.S. PATENT DOCUMENTS

| | | | |
|---|---|---|---|
| 3,843,908 | 10/1974 | Priegnitz | 317/31 |
| 4,025,823 | * 5/1977 | Lang et al. | 361/111 |
| 4,183,071 | 1/1980 | Russell | 361/59 |
| 4,205,261 | 5/1980 | Franklin | 318/480 |
| 4,331,996 | * 5/1982 | Matsko et al. | 361/92 |
| 4,356,526 | * 10/1982 | Russell | 361/59 |
| 4,890,184 | 12/1989 | Russell | 361/87 |

* cited by examiner

Primary Examiner—Josie Ballato
Assistant Examiner—Kim Huynh
(74) Attorney, Agent, or Firm—Kenyon & Kenyon

(57) ABSTRACT

An undervoltage circuit breaker has an electromagnet for triggering a switching device and a driver circuit that supplies power to the electromagnet. The driver circuit contains a pulse generator for generating a holding current for the electromagnet and a capacitance dimensioned so that delayed triggering of the electromagnet is possible. Due to the variable pulse duty factor of the pulse generator, the energy content of the capacitance is utilized favorably. An elevated operating voltage can also be selected and therefore a smaller capacitor may be selected to advantage.

4 Claims, 2 Drawing Sheets

US 6,233,129 B1

UNDERVOLTAGE CIRCUIT BREAKER WITH AN ELECTROMAGNET

FIELD OF THE INVENTION

The present invention relates to an undervoltage circuit breaker for monitoring the voltage of a single-phase or multi-phase system including an electromagnet for triggering a switching device, and a driver circuit that supplies power to the electromagnet. The driver circuit includes a rectifier circuit for obtaining a direct current from the system, a capacitance and a threshold circuit for interrupting a holding current that keeps the electromagnet in an energized condition when the voltage of the system falls below a predetermined level. The driver circuit is designed as a pulse generator to generate a holding current that is essentially independent of the line voltage when the latter is sufficiently high. The driver circuit also contains an operational amplifier that is controlled by a timer and an electronic switch that is controlled by the operational amplifier and is connected in series with the electromagnet and with a resistor, wherein the voltage dropping at the resistor is applied to the timer. The capacitance is designed as an energy storage device to supply power to the electromagnet if triggering is to be delayed.

BACKGROUND INFORMATION

A conventional undervoltage circuit breaker with these features is described in U.S. Pat. No. 4,890,184.

Although undervoltage circuit breakers are used in electrical installations to prevent damage to loads whose operating voltage must not fall below a predetermined level, it may nevertheless be desirable not to have each voltage reduction lead to shutdown of the load. In particular, it may be desirable to disregard brief interruptions or brief dropping of the voltage below a minimum. This is accomplished by the above-mentioned delay in triggering. The small space provided in compact low-voltage circuit breakers, for example, for installation of an undervoltage circuit breaker does not, however, usually make it possible to accommodate capacitors with a suitably large capacitance in addition to the electromagnet and the components of the driver circuit. Likewise, it is not usually possible to accommodate suitable capacitors outside the switching device because the installation space provided for the power switch in switchgear or control cabinets is dimensioned only for the power switch. Therefore, the delay that can be achieved is limited to relatively small values.

One of the objects of the present invention is to create a predetermined required triggering delay when there is an undervoltage, using a smallest possible capacitance.

SUMMARY OF THE INVENTION

An undervoltage circuit breaker according to the present invention includes:
a series circuit of another electronic switch and a resistor is connected in parallel to another resistor which is in series with an electromagnet,
the resistor of the series circuit has a lower resistance than the resistor that is connected in series with the electromagnet, and
an additional electronic switch can be controlled by a threshold circuit.

Thus, a current flowing through the electromagnet can be reduced to a minimum required holding current when the voltage to be monitored drops below a limit value and triggering is to occur after a time delay. Due to a reduction in the holding current, energy content of the capacitance is better utilized to generate a longer possible time delay.

As explained above, an essential property of the undervoltage circuit breaker according to the present invention provides that a relatively long time delay can be achieved while using a comparatively small capacitance. Therefore, an electromagnet, a respective driver circuit and a capacitor which is provided as the energy storage device for the delay time can be combined to form a single unit. A further embodiment of the undervoltage circuit breaker according to present invention provides that the driver circuit (which includes the capacitor) is arranged on a printed circuit board that matches the width of the electromagnet and extends beyond the electromagnet M in the longitudinal direction, with the total capacitance required provided by at least one capacitor that is mounted on the part of the circuit board projecting beyond the electromagnet in such a way that substantially the only space required is the space that extending in the longitudinal direction of the electromagnet.

DETAILED DESCRIPTION OF THE INVENTION

Figure 1:
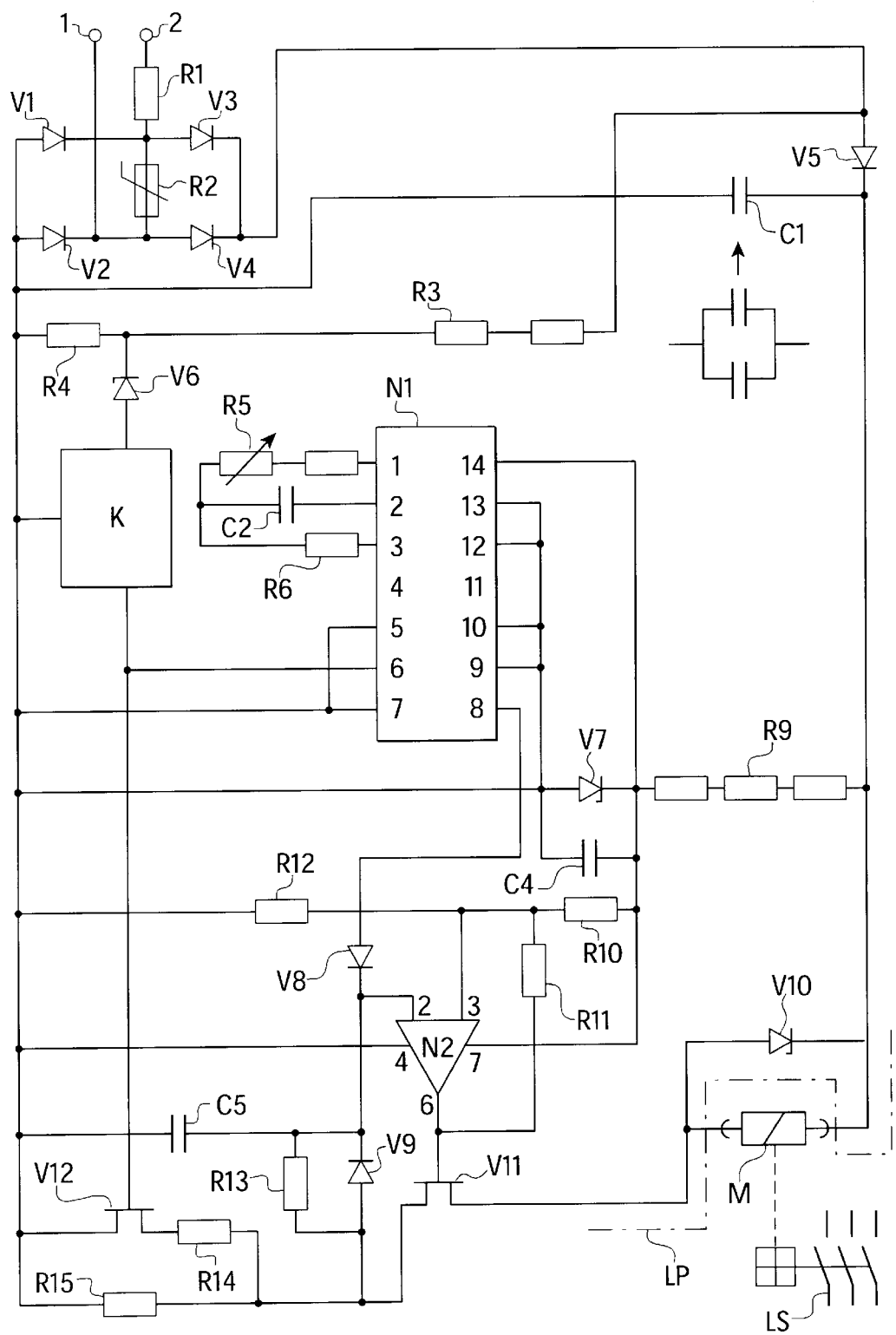
FIG. 1 shows a block diagram of the driver circuit of an undervoltage circuit breaker according to the present invention.

The voltage to be monitored is applied at terminals 1 and 2. Then an operating voltage for the driver circuit is obtained from rectifier diodes V1, V2, V3 and V4 via a bridge circuit. A resistor R1 limits the starting current, while overvoltages are limited by a non-linear series resistor R2. A capacitance C1 is charged via another diode V5. With a suitable rating of capacitance C1, the half-waves supplied from the bridge circuit are formed and an energy storage device is formed to supply power to an electromagnet M shown in the lower right portion of FIG. 1. Electromagnet M is provided to trigger a power switch LS.

An electronic switch V11 and a resistor R15 are connected in series with electromagnet M. Electronic switch V11 can be controlled by an operational amplifier N2 having a first input for receiving a reference voltage over R10, R12 and second input for receiving voltage from a timing circuit that includes a resistor R13 and a capacitor C5. The voltage drop at resistor R15 is applied to timing circuit R13, C5. Because of the periodic operation of the circuit described above, a current with a variable pulse duty factor flows through electromagnet M. Therefore, the average current remains essentially unchanged when there is a fluctuating operating voltage as long as the threshold circuit (to be described below) does not respond. To form a switching hysteresis, resistor R11 acts (on the reference potential) on voltage divider R10, R12. A diode V9 serves for non-delayed charging of timer R13, C5.

The operating voltage available at the input of the circuit is divided by a voltage divider R3, R4 and sent via a Zener diode V6 to a flip-flop K. Flip-flop K controls another electronic switch V12 as well as an integrated circuit N1 through its input 6. Blocking of electronic switch V12 causes a resistor R14 to become ineffective; this resistor is connected in parallel to resistor R15 and its relatively low resistance determines the operating current of electromagnet. Terminal points 1, 2 and 3 of integrated circuit N1 are wired with a combination of fixed and adjustable resistors R5, R6 and a capacitance C2, so a delayed control signal is obtained at output 8. Integrated circuit N1 may be, for example, the component available commercially via a code designation 4060.

To ensure that the operation of integrated circuit N1 and operational amplifier N2 will be substantially independent from the capacitance of capacitor C1, a resistor combination R9 is provided in combination with a Zener diode V7 and a capacitor C4. Another diode V10 is connected in parallel to electromagnet M and allows the current to continue flowing during the periodic shutdown of electronic switch V11.

The processes providing a condition of an undervoltage is explained below with respect to FIG. 1. In normal operation, the voltage at terminal points 1 and 2 may assume any values above a predetermined limit up to the overvoltage range. Operational amplifier N2 in combination with electronic switch V11 and the respective components described above ensures that a largely uniform current through electromagnet M is maintained by an adapted variation in the pulse duty factor. If the voltage at points 1 and 2 drops below the above-mentioned limit, flip-flop K applies voltage to integrated circuit N1 and the other electronic switch V12 over terminal point 6. Electronic switch V12 is directly blocked, so that current flowing through the electromagnet M is reduced to a low holding current. At the same time, the time delay set by an adjustable resistor R5 begins to run; when this time elapses, operational amplifier N2 receives a voltage over output 8 of integrated circuit N1 and a diode V8, and electronic switch V11 is blocked. Electromagnet M then drops and triggers power switch LS.

When the voltage is restored at points 1 and 2 or this voltage increases above the predetermined limit, electronic switch V12 is released again, so resistor R14 becomes active again. Therefore, a higher current needed for electromagnet M can flow again as soon as operational amplifier N2 also begins operating and releases electronic switch V11.

Figure 2:
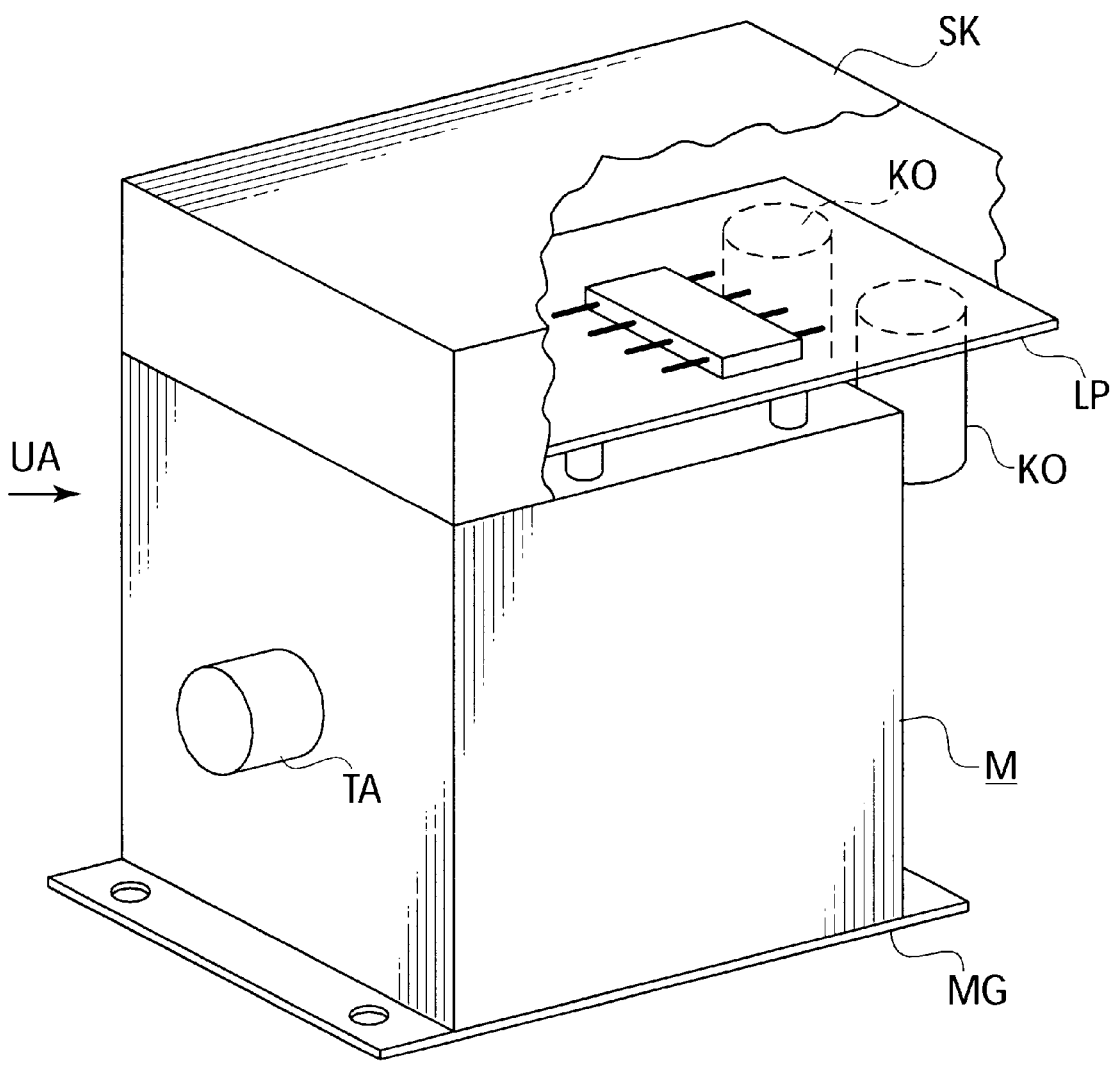
FIG. 2 shows a perspective view of an undervoltage circuit breaker with a driver circuit illustrated in FIG. 1.

FIG. 2 shows an example of the mechanical design of an undervoltage circuit breaker UA that is installed in a low-voltage power switch. Electromagnet M, which was previously described with respect to FIG. 1, is designed as a solenoid plunger magnet and has a solenoid plunger TA for suitably connecting to a tripping shaft in the breaker mechanism of the power switch. A spring energy storage device is a component of electromagnet M, but is not shown in FIG. 2. A base plate MG connected to electromagnet M is provided to mount undervoltage circuit breaker UA in the power switch.

A printed circuit board LP is applied to the top side of electromagnet M (whose border is indicated with a dash-dot line in the area of electromagnet M in FIG. 1). All the elements of the circuitry described above with respect to FIG. 1 are arranged on circuit board LP. Capacitance C1 is distributed between two capacitors KO, as is also indicated as a circuit variant in FIG. 1.

Circuit board LP is designed as shown in FIG. 2 so that it corresponds approximately to the width of electromagnet M but is longer than the electromagnet M. Therefore, circuit board LP has a projecting part in the longitudinal direction of the electromagnet M, which corresponds to the longitudinal axis of solenoid plunger TA. The two capacitors KO are mounted on this projecting part of circuit board LP so they extend down. Therefore, the space required is especially small because essentially only space extending in the longitudinal direction of electromagnet M is needed. Only a small height is needed because the other components are all mounted so they lie flat on circuit board LP. A protective cap SK covers circuit board LP and protects the circuit board LP from external influences.

What is claimed is:

1. A undervoltage circuit breaker for monitoring the voltage of a single-phase or multi-phase system, comprising:

an electromagnet for triggering a switching device;
a driver circuit that supplies power to the electromagnet;
wherein the driver circuit includes a rectifier circuit for obtaining a direct currents a capacitance and a threshold circuit to interrupt a holding current that keeps the electromagnet in the energized state when the voltage of the system falls below a predetermined level,
the driver circuit is designed as a pulse generator to generate a holding current that is essentially independent of the line voltage of the system when the line voltage is sufficiently high,
the driver circuit includes an operational amplifier that is controlled by a timer and the driver circuit also includes an electronic switch that is controlled by the operational amplifier and is connected in series with the electromagnet and in series with a resistor, wherein the timer receives the voltage dropping at the resistor, and
the capacitance is dimensioned as an energy storage device to supply power to the electromagnet when triggering is to be delayed; and
a series circuit including an additional electronic switch and a resistor is connected in parallel to the resistor which is in series with the electromagnet,
wherein the resistor of said series circuit having a lower resistance than the resistor in series with the electromagnet, and
the additional electronic switch is controlled by the threshold circuit.

2. The undervoltage circuit breaker according to claim 1, wherein the driver circuit including the capacitance is on a circuit board that matches the width of the electromagnet and projects beyond it in the longitudinal direction, wherein the capacitance is formed by at least one capacitor that is mounted on the part of the circuit board that projects beyond the electromagnet so that only a apace that extends in the longitudinal direction of the electromagnet is required.

3. An undervoltage circuit breaker for monitoring voltage of a system, the system including one of a single-phase system and a multi-phase system, comprising:

an electromagnet triggering a switching device;
a driver circuit providing power to the electromagnet and designed as a pulse generator for generating a holding current, the holding current maintaining the electromagnet in an energized state when the voltage of the system falls below a predetermined threshold level, the driver circuit including:
a rectifier circuit for receiving a direct current from terminals of the system,
a capacitance member and a threshold circuit for interrupting the holding current, the holding current being substantially independent of a line voltage received from the terminals when the line voltage reaches a predetermined limit, wherein the capacitance member is configured as an energy storage device for supplying power to the electromagnet when a triggering action is delayed, a timing circuit, an operational amplifier being controlled by the timing circuit, and a first electronic switch being controlled by the operational amplifier, the first electronic switch connected in series with the electromagnet and with a first resistor, the timing circuit receiving a drop of voltage across the first resistor; and a series circuit including a second electronic switch and a second resistor, the series circuit being connected in parallel to the first resistor, the second resistor having a first resistance value being lower than a second resistance value of the first resistor, the second electronic switch being controlled by the threshold circuit.

4. The undervoltage circuit breaker according to claim 3, wherein the capacitance member is disposed on a circuit board, the circuit board having a first width subltantially corresponding to a second width of the electromagnet and projecting beyond the electromagnet in a longitudinal direction, and wherein the capacitance member is formed by at least one capacitor disposed on a portion of the circuit board requiring a substantially small space that extends in the longitudinal direction of the electromagnet.

* * * * *